United States Patent
Loeb et al.

(10) Patent No.: US 10,542,069 B2
(45) Date of Patent: Jan. 21, 2020

(54) SYSTEM AND METHOD FOR PROVIDING A CUSTOMIZED RESOURCE

(71) Applicants: Michael R. Loeb, New York, NY (US); Dan McCabe, Wilton, CT (US); Steven Marcus, New Rochelle, NY (US); Andrew Bein, Riverside, CT (US)

(72) Inventors: Michael R. Loeb, New York, NY (US); Dan McCabe, Wilton, CT (US); Steven Marcus, New Rochelle, NY (US); Andrew Bein, Riverside, CT (US)

(73) Assignee: MOBISAVE LLC, New York, NY (US)

( * ) Notice: Subject to any disclaimer, the term of this patent is extended or adjusted under 35 U.S.C. 154(b) by 189 days.

(21) Appl. No.: 15/643,029

(22) Filed: Jul. 6, 2017

(65) Prior Publication Data
US 2018/0020039 A1  Jan. 18, 2018

Related U.S. Application Data

(60) Provisional application No. 62/361,737, filed on Jul. 13, 2016.

(51) Int. Cl.
*G06F 15/16* (2006.01)
*H04L 29/08* (2006.01)
*H04W 88/02* (2009.01)

(52) U.S. Cl.
CPC ........... *H04L 67/02* (2013.01); *H04L 67/146* (2013.01); *H04L 67/306* (2013.01); *H04W 88/02* (2013.01)

(58) Field of Classification Search
None
See application file for complete search history.

(56) References Cited

U.S. PATENT DOCUMENTS

| | | | | |
|---|---|---|---|---|
| 2008/0189360 A1* | 8/2008 | Kiley | ........... | H04L 67/306 709/203 |
| 2014/0379823 A1* | 12/2014 | Wilsher | ........... | H04L 12/287 709/206 |
| 2015/0026289 A1* | 1/2015 | Nordness | ........... | H04L 67/1097 709/213 |

(Continued)

*Primary Examiner* — Phyllis A Book
(74) *Attorney, Agent, or Firm* — Buckley, Maschoff & Talwalkar, LLC

(57) ABSTRACT

Provided are methods and devices for providing a resource. In one example, a method includes receiving a request to render a resource, the request comprising item information associated with an item, extracting an item identifier from the item information, and determining, by the web server, whether the user device corresponds to an existing user of a mobile application corresponding to the request. In response to determining the user device corresponds to an existing user of the mobile application, the method may include determining a customized URI associated with the item and associated with the mobile application based on the extracted item identifier and transmitting the customized URI. In response to determining the user device does not correspond to an existing user of the mobile application, the method may include transmitting a URL of a web page associated with the mobile application to the user device.

20 Claims, 5 Drawing Sheets

(56) References Cited

U.S. PATENT DOCUMENTS

2016/0092339 A1* 3/2016 Straub ................. G06F 9/44521
                                                              717/124
2016/0225059 A1* 8/2016 Chow ..................... G06F 16/22
2017/0139925 A1* 5/2017 Shah .................... H04L 65/607
2017/0295257 A1* 10/2017 Bao ....................... H04L 67/34

* cited by examiner

SYSTEM AND METHOD FOR PROVIDING A CUSTOMIZED RESOURCE

CROSS-REFERENCE TO RELATED APPLICATION(S)

This application claims the benefit under 35 USC § 119(e) of US Provisional Patent Application No. 62/361,737, filed on Jul. 13, 2016, the entire disclosure of which is hereby incorporated by reference and for all purposes.

BACKGROUND

A mobile application provider may develop an optionally-installable application (also referred to as app, mobile app, and the like) for a given type of device and submit the application to an application store provider, thus making the application available for users to purchase and/or download via the application store. The application store (also referred to as app store, app marketplace, or the like) is a digital distribution platform for application software that users may opt to install on devices of most types. Application stores have become a common component on personal computers, smartphones, tablets, and the like. Once a user has installed the mobile application on their device, the device may use the application to access information payloads provided by the application provider and/or by third-parties. In many cases, the application provider may also provide a website that can be used to access at least some of the same information and payloads that can be accessed by the optionally-installable application.

In mobile applications, a Uniform Resource Identifier (URI) may be used to access a respective resource within the mobile application. In its broadest sense, a URI is a string of characters used to identify points of content, whether it be a page of text, a video or sound clip, a still or animated image, a program, or the like. Within a mobile application, a resource may be identified by one or more URIs and access to the resource may be performed by calling a Hypertext Transfer Protocol (HTTP) operation on one of the URIs. The HTTP operation may launch a specific experience or piece of content in the mobile app.

SUMMARY

According to an aspect of an example embodiment, provided is a device for determining a customized resource, the device including a network interface configured to receive a request to render a resource from a user device, the request including item information associated with an item, an extractor configured to extract an item identifier from the item information, and a processor configured to determine whether the user device corresponds to an existing user of a mobile application corresponding to the request, wherein in response to determining the user device corresponds to an existing user of the mobile application, the processor further determines a customized uniform resource indicator (URI) associated with the item and associated with the mobile application based on the extracted item identifier and controls the network interface to transmit the customized URI to the mobile device, and in response to determining the user device does not correspond to an existing user of the mobile application, the processor further controls the network interface to transmit a uniform resource locator (URL) of a web page associated with the mobile application to the mobile device.

According to an aspect of another example embodiments, provided is a method for determining a customized resource, the method including receiving, by a web server from a user device, a request to render a resource, the request comprising item information associated with an item, extracting, by the web server, an item identifier from the item information, determining, by the web server, whether the user device corresponds to an existing user of a mobile application corresponding to the request, in response to determining the user device corresponds to an existing user of the mobile application, determining, by the web server, a customized uniform resource indicator (URI) associated with the item and associated with the mobile application based on the extracted item identifier and transmitting, to the mobile device, the customized URI, and in response to determining the user device does not correspond to an existing user of the mobile application, transmitting, by the web server to the mobile device, a uniform resource locator (URL) of a web page associated with the mobile application.

According to an aspect of another example embodiments, provided is a non-transitory computer readable medium having stored therein instructions that when executed cause a computing device to perform a method for determining a customized resource, the method including receiving, by a web server from a user device, a request to render a resource, the request comprising item information associated with an item, extracting, by the web server, an item identifier from the item information, determining, by the web server, whether the user device corresponds to an existing user of a mobile application corresponding to the request, in response to determining the user device corresponds to an existing user of the mobile application, determining, by the web server, a customized uniform resource indicator (URI) associated with the item and associated with the mobile application based on the extracted item identifier and transmitting, to the mobile device, the customized URI, and in response to determining the user device does not correspond to an existing user of the mobile application, transmitting, by the web server to the mobile device, a uniform resource locator (URL) of a web page associated with the mobile application.

Other features and aspects will become apparent from the following detailed description when taken in conjunction with the drawings and the claims.

BRIEF DESCRIPTION OF THE DRAWINGS

Features and advantages of the example embodiments, and the manner in which the same are accomplished, will become more readily apparent with reference to the following detailed description taken in conjunction with the accompanying drawings.

Figure 1:
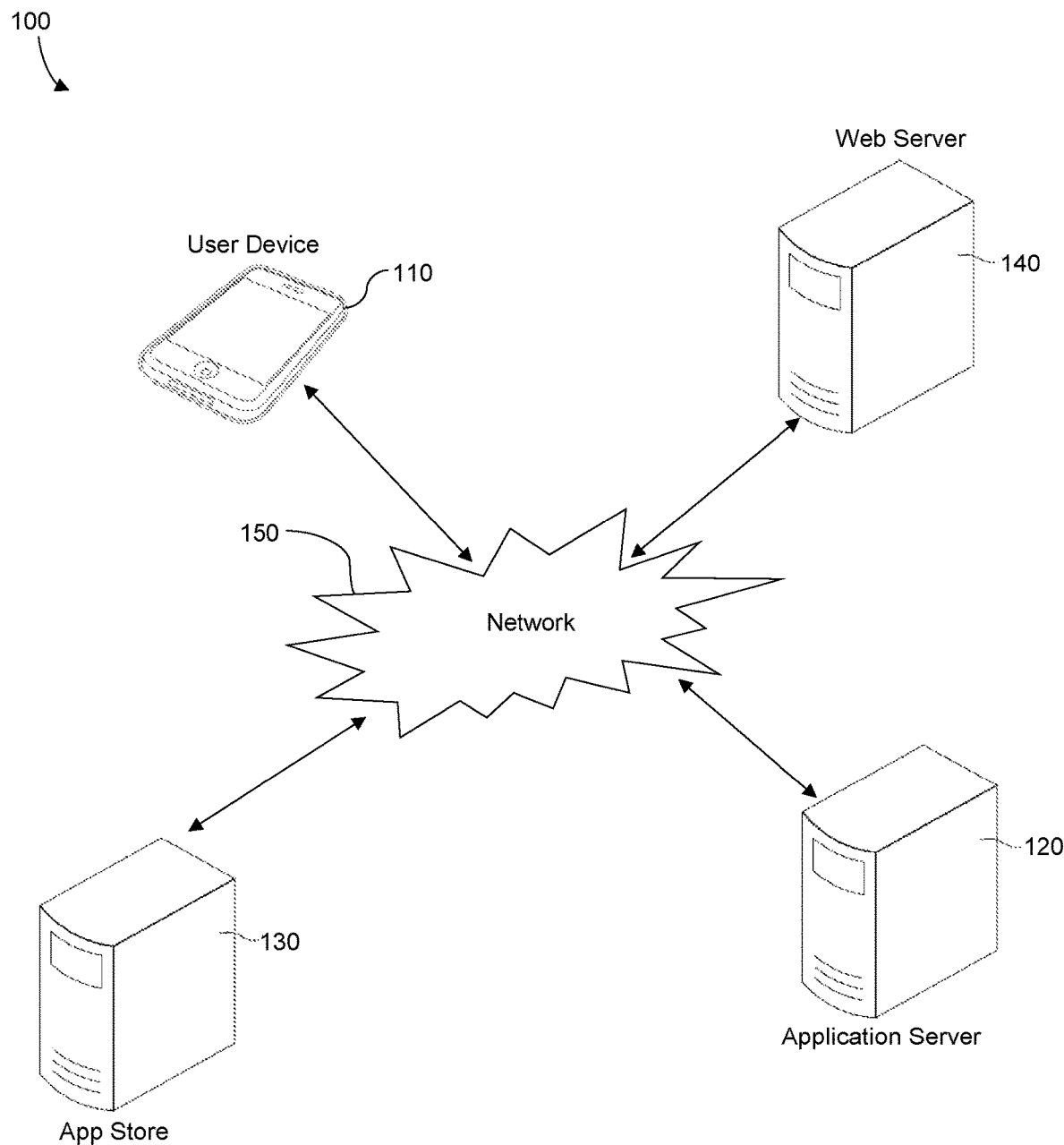
FIG. 1 is a diagram illustrating a system for providing a customized resource in accordance with an example embodiment.

Throughout the drawings and the detailed description, unless otherwise described, the same drawing reference numerals will be understood to refer to the same elements, features, and structures. The relative size and depiction of these elements may be exaggerated or adjusted for clarity, illustration, and/or convenience.

DETAILED DESCRIPTION

In the following description, specific details are set forth in order to provide a thorough understanding of the various example embodiments. It should be appreciated that various modifications to the embodiments will be readily apparent to those skilled in the art, and the generic principles defined herein may be applied to other embodiments and applications without departing from the spirit and scope of the invention. Moreover, in the following description, numerous details are set forth for the purpose of explanation. However, one of ordinary skill in the art should understand that embodiments may be practiced without the use of these specific details. In other instances, well-known structures and processes are not shown or described in order not to obscure the description with unnecessary detail. Thus, the present disclosure is not intended to be limited to the embodiments shown, but is to be accorded the widest scope consistent with the principles and features disclosed herein.

According to various aspects, provided herein is a system for providing a customized resource to a mobile device. For example, the system may determine whether the mobile device corresponds to an existing user of a mobile application or is an intended (or new) user of the mobile application. Based on the determining, the system may provide a customized uniform resource indicator (URI) within the mobile application that is associated with an item, or the system may provide a uniform resource locator (URL) of a web page associated with the mobile application. In these examples, the URI may represent a piece of content, group of content, experience, and the like, within the mobile application already on the mobile device or downloaded from an application server hosting the mobile application, while the URL may represent a web page or other resource accessible through the Internet or other computer network, and may include a location of the web page on the Internet and a method for retrieving the web page.

FIG. 1 illustrates a system 100 for providing a customized resource in accordance with an example embodiment. Referring to FIG. 1, the system 100 includes a plurality of devices that are connected to one another via a network 150. For example, the network 150 may be a public network such as the Internet, a private network, or a combination thereof. Also, the network 150 may be a wired network, a wireless network (e.g., cellular, radio), or a combination thereof. In this example, the system 100 includes a user device 110, an application server 120, an app store server 130, and a web server 140 connected to each other through the network 150. It should also be appreciated that additional devices may be connected on the network 150. Also, the system 100 may not include one or more of the devices shown in FIG. 1.

The user device 110 may be a mobile device such as a mobile phone, a tablet, a phablet, a notebook, a notepad, a smart wearable device, and the like. As another example, the user device 110 may be a computer, a laptop, a server, and the like. The user device 110 may download and install mobile applications also referred to herein as applications or mobile apps. The user device 110 may select an application for download from the application store 130 (e.g., app store server), and download the mobile application from the application store 130 and/or the application server 120 that controls the mobile application. For example, the application store 130 may have a widget (e.g., a displayed icon) stored and displayed on a user interface shown on the user device 110 enabling the user device 110 to connect with the application store 130 to perform the download. Examples of the application store 130 include Google Play, Apple's App Store, Windows Store, and the like.

After the mobile application is downloaded and installed, the mobile application may be executed on the user device 110, and be controlled by the application server 120. In this example, the application server 120 may be a computing device or a plurality of computing devices designed to install, host, and operate mobile applications for end users such as user device 110. A mobile application hosted by the application server 120 may be used by multiple and simultaneously connected user devices. For example, the application server 120 may include hardware and software that work together to provide computing-intensive operations and services to the application. The application server 120 may execute and provide the user device 110 access when utilizing the installed mobile application's business/functional logic. Also, the application server 120 may provide data redundancy, high availability, load balancing, user management, data/application security and a centralized management interface. According to various example embodiments, the mobile application hosted by the application server 120 may be a savings based application that provides its users with rebates, promotional offers, discounts, and the like, on products and/or services that may be purchased in a retail store, online, and the like.

Web server 140 may include an installation-detection component. That is, the web server 140 may determine whether or not a mobile application is installed on the user device 110. In the examples herein, the functions of the web server 140 may be incorporated into the application server 120 instead of a standalone device, but the web server 140 and its operations are shown separately here for convenience of description. According to various aspects, the web server 140 may determine or infer if a mobile application is installed on the user device 110. For example, the web server 140 may provide to the user device 110 a piece of executable code (e.g., a JavaScript function) for execution on the user device 110 which may report to the web server 140 whether the mobile application is installed, whether the user device 110 can handle a URL or URI scheme that is associated with the installable mobile application, whether the mobile application was previously installed, and the like. The web server 140 may also determine the device type of the user device 110, and use this information to determine whether the mobile application is installed. In some examples, the web server 140 may store a list of all devices, usernames, payment accounts, and/or the like, that have been registered before through the mobile application. Therefore, as another example, the web server 140 may receive a device ID of the user device 110 and compare this information to previous users of the mobile application to determine if the application is installed on the user device 110. The device ID may include one or more of an IMEI, a SIM identifier, an IMSI, MAC address, and the like.

According to various aspects, the user device 110 may transmit a request for a resource to the application server 120. The request may be associated with an item (e.g., a service or a product) and it may also be associated with a mobile application hosted by the application server 120. For example, the request may include a text message with characters or strings of characters in the body of the text message that are associated with the item. The text message may include a name of a product, a product identifier, a catch phrase related to the product, and the like. As another example, the request may include a vocal command or spoken words that are input by the user of the user device 110 through a microphone or the like, recognized by the user device 110, and transmitted to the application server 120. According to various aspects, the application server 120 and/or the web server 140 may determine whether the mobile application corresponding to the request has been installed on the user device 110.

In response to determining that the mobile application is installed on the user device 110 (i.e., determining that the user device 110 corresponds to an existing user of the mobile application) the application server 120 may extract an item identifier from the request and determine a customized URI associated with the item based on the extracted item identifier. For example, the customized URI may link to a resource, a page, a plurality of pages, or the like, included within the mobile application. The application server 120 may transmit the customized URI to the mobile application executing on the mobile device in order to render the resource associated with the item on a screen of the user device 110. If, however, the application server 120 and/or the web server 140 determine that the user device 110 is not an existing user of the mobile application, the application server 120 may transmit a uniform resource locator (URL) of a web page associated with the mobile application to the user device 110 to enable the user device 110 to download and install the mobile application.

According to various example embodiments, the customized URI may be determined from among a plurality of customized URIs included within the mobile application based on item identifier. The generic syntax for URI schemes is defined in Request for Comments ("RFC") memorandum 3986 published by the Internet Engineering Task Force ("IETF"). According to RFC 3986, a URI (including a URL) may consist of four parts:

<scheme name>: <hierarchical part>[?<query>] [#<fragment>]

A customized URI may begin with a scheme name that refers to a specification for assigning identifiers within that scheme. The scheme name may consist of a letter followed by any combination of letters, digits, and the plus ("+"), period ("."), or hyphen ("−") characters; and may be terminated by a colon (":"). The hierarchical portion of the URL is intended to hold identification information that is hierarchical in nature. Often this part is delineated with a double forward slash ("//"), followed by an optional authority part and an optional path. The optional query portion may be delineated with a question mark and may include additional identification information that is not necessarily hierarchical in nature. Together, the path part and the query portion identify a resource within the scope of the URIs scheme and authority. The query string syntax is not generically defined, but is commonly organized as a sequence of zero or more <key>=<value> pairs separated by a semicolon or ampersand.

In the examples herein, a customized URI associated with an item may be determined and provided to the mobile application executing on the user device 110. The item may be a product or a service. In this example, the customized URI may refer to a customized resource within the mobile application that is uniquely associated with the item, such as a customized page for a product offer or service offer associated with the item (e.g., a high value rebate for the item, a free item, etc.). According to various embodiments, the application server 120 may compare the extracted item identifier, such as the item name, item reference number, catch phrase, or the like, to previously stored URIs (i.e., character strings) to determine which URI corresponds to the item identifier. As an example, the application server 120 may compare a string of characters, one or more words, a phrase, or the like of the item identifier extracted from the request from the user device 110 with the string of characters included in the hierarchical portion, the query, the fragment, and/or the like, of the URI, to determine the custom URI. When a match is found between the item identifier and a previously stored URI, the application server 120 may determine the matching URI corresponds to a customized URI for the item identifier extracted from the request. As a non-limiting example, the user device 110 may transmit a text message that recites the name of a product, e.g., "Product X" or the user device 110 may transmit a vocal command that says "I want Product X for free." When the request is received from the user device 110, the application server 120 may extract the product name (Product X) from the body of the text message or the vocal command and determine a customized resource for Product X based on a search of previously stored URIs. In response to matching the name Product X to a URI previously stored, the application server 120 may deliver the URI to the user device 110 as a customized URI.

Figure 2:
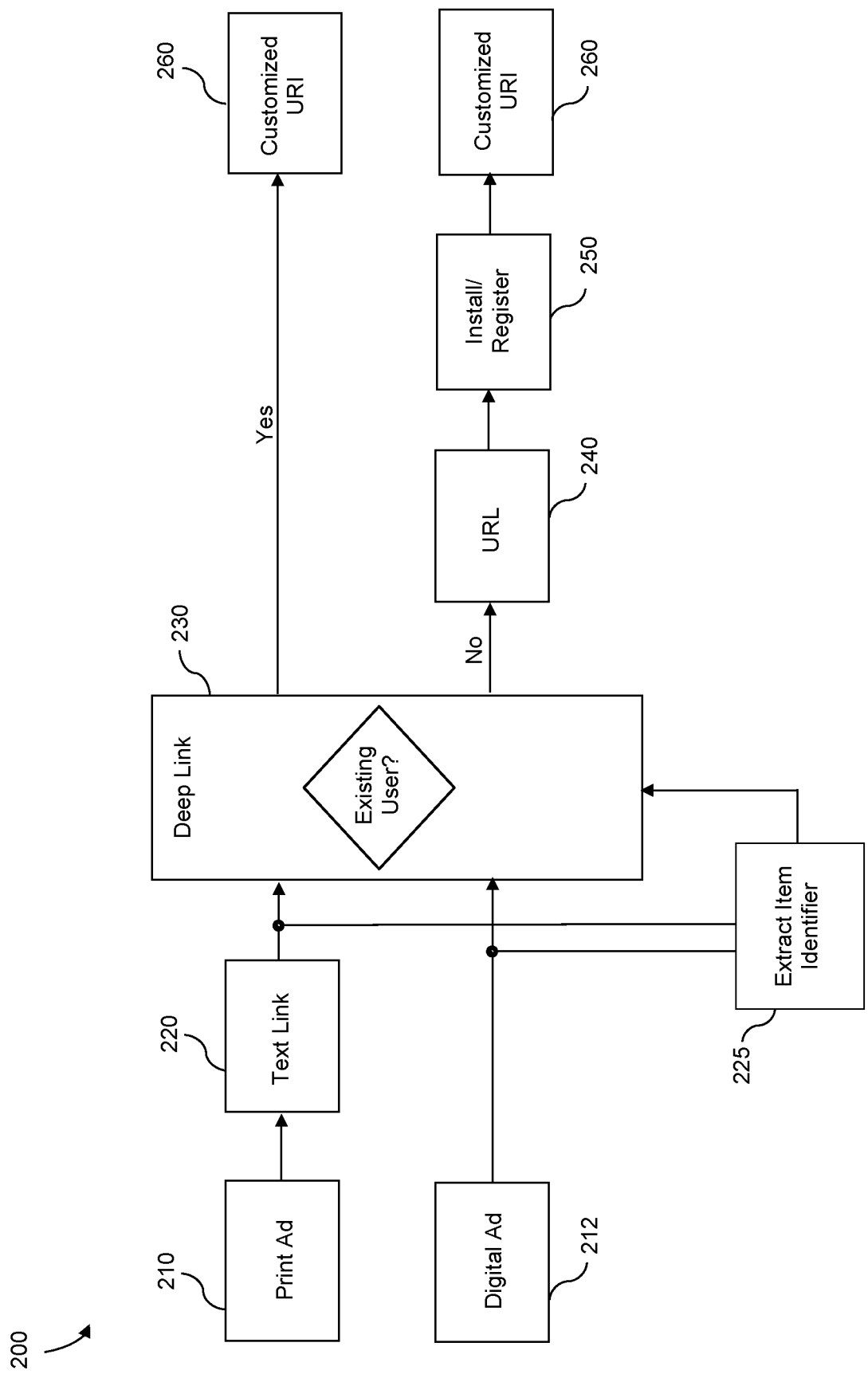
FIG. 2 is a diagram illustrating a process for providing a customized resource in accordance with an example embodiment.

FIG. 2 illustrates a process 200 for providing a customized resource in accordance with an example embodiment. As an example, the process 200 may be performed by the application server 120 shown in FIG. 1. In this example, a user of a user device detects an advertisement (e.g., a high value rebate offer, free product offer, full refund offer, etc.) on the purchase of a product. The advertisement requires a user to download and install a mobile application hosted by the application server before the user can receive the offered rebate. Referring to FIG. 2, the offered advertisement may be a printed offer 210 such as an offer printed on product packaging, a newspaper, a circular, or the like. In this example, the user may enter a code into their mobile device and text the code (i.e., request) to a specific address or number that corresponds to the application server. As another example, the user may speak a voice command into the user device and transmit the vocal command to the application server. In response, the application server may reply with a text link 220 directing the user device to a deep link determination 230. As another example, the advertisement could be a digital ad 212 displayed on a screen of the user's device. Upon selecting the digital ad 212, the user device can be directed to the deep link determination 230. The deep link determination in 230 may be performed by the application server or another web server. Furthermore, when the request is transmitted to the deep link determination in 230 from either the text link 220 or the digital ad 212, the application server may extract an item identifier in 225 from the request. For example, the item identifier may include a product name, a catch phrase, a code, and the like.

According to various example embodiments, the deep link determination 230 may include a determination as to whether the user of the user device is an existing user of the mobile application. In response to determining the user device corresponds to an existing user of the mobile application, the application server may determine a deep link to a customized URI associated with the item and associated with the mobile application based on the extracted item identifier and transmit the customized URI to the mobile device in 260. In this example, the customized URI may represent a deep link within the mobile application to customized content associated with the item such as an offer for a high value rebate on the item, and a link to collecting the rebate. The customized URI include a button, a link, an option, or the like, which the user may select through the user device to receive a high value rebate for the item. For example, the URI may include a transaction button or link that allows the user to automatically trigger the application server to transmit a refund for the product, in real time, to a payment account of the user that is registered with the mobile application.

As another example, in response to determining the user device does not correspond to an existing user of the mobile application, the application server may transmit a URL of a web page associated with the mobile application to the mobile device. As an example, the URL may be a landing page that allows the user device to download and install the mobile application in 250. Furthermore, when the application is downloaded and installed, the application server may transmit the customized URI to the mobile device in 260 based on the item identifier previously received.

Figure 3:
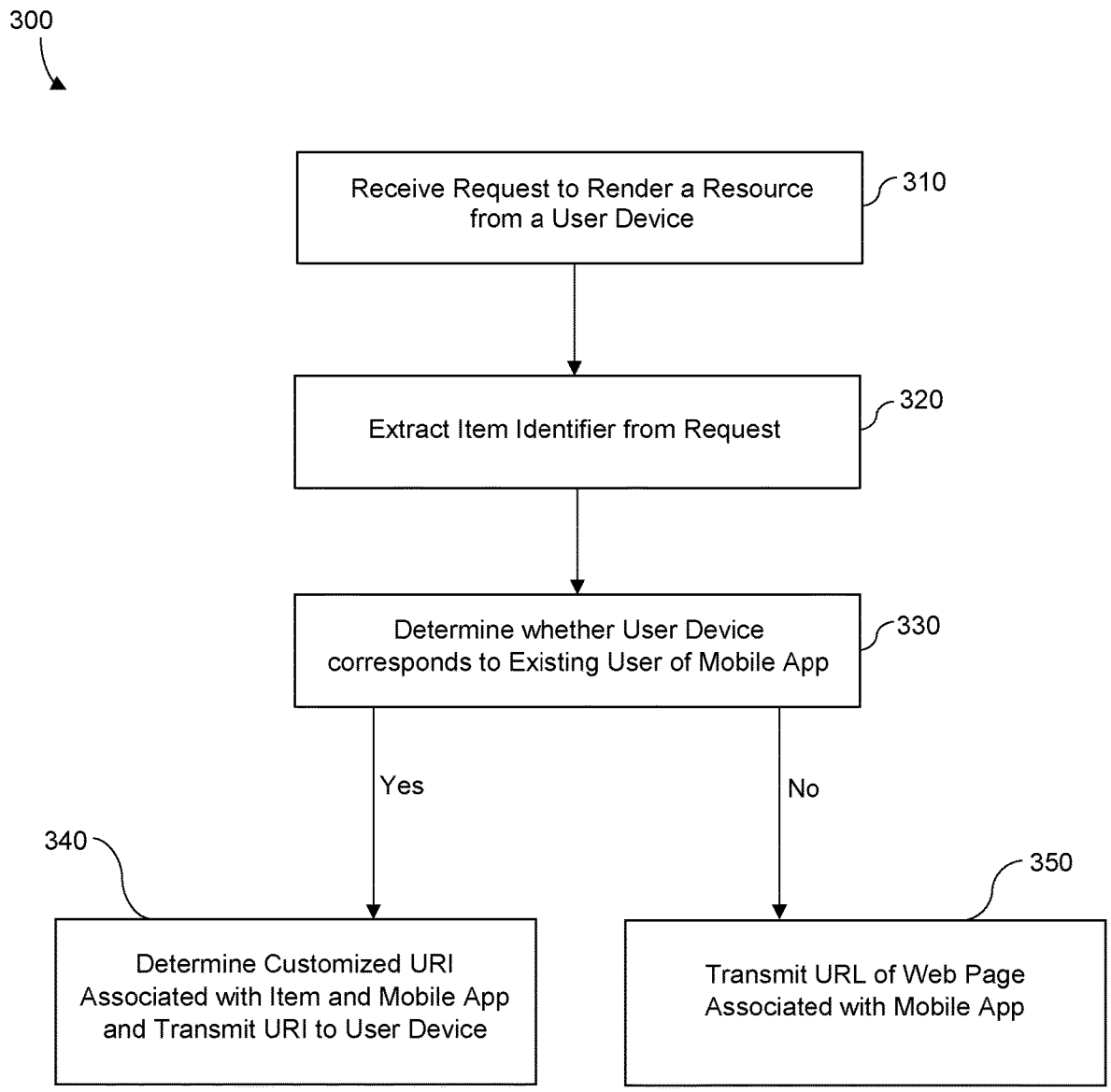
FIG. 3 is a diagram illustrating a method of providing a customized resource in accordance with an example embodiment.

FIG. 3 illustrates a method 300 of providing a customized resource in accordance with an example embodiment. For example, the method 300 may be performed by the application server 120 shown in FIG. 1, or another device or combination of devices. Referring to FIG. 3, the method includes receiving, from a user device, a request to render a resource, in 310. The request is associated with a mobile application that must be installed before the request can be handled. For example, the request may include item information associated with an item such as a product or a service, along with a request for a rebate or refund on the product. In one example, the request may include a text message and the item information may include characters included in a body of the text message. As another example, the request may include speech, spoken words, a vocal command or the like. In 320, the method includes extracting an item identifier from the item information included in the request. For example, the item identifier may be a name of a product or a service, a catch phrase, and the like, extracted from a text message or from a spoken command.

In 330, the method includes determining whether the user device corresponds to an existing user of the mobile application corresponding to the request. The determination of whether the user of the user device is an existing user of the mobile application may be based on one or more factors, for example, device ID, username, payment account information, and/or the like. For example, the user device may be determined to be an existing user of the mobile application in response to detecting that the mobile application is currently installed on the user device. In response to determining the user device corresponds to an existing user of the mobile application in 330, in 340 the method includes determining a customized URI associated with the item and associated with the mobile application based on the extracted item identifier and transmitting, to the mobile device, the customized URI. For example, the customized URI may enable the user device to deep link to a page within the mobile application that is associated with the item. For example, the deep link may be to a page that allows the user of the user device to automatically request a rebate for the item. As another example, in response to determining the user device does not correspond to an existing user of the mobile application in 330, in 350 the method includes transmitting, by the web server to the mobile device, a URL of a web page associated with the mobile application.

Figure 4:
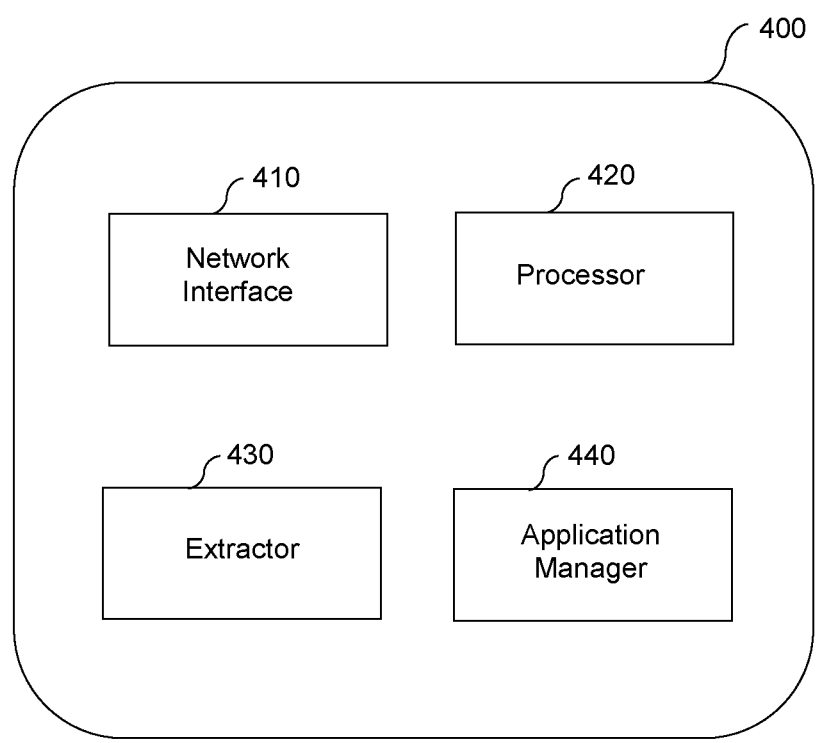
FIG. 4 is a diagram illustrating an application server in accordance with an example embodiment.

FIG. 4 illustrates an application server 400 in accordance with an example embodiment. For example, the application server 400 may correspond to the application server 120 shown in FIG. 1. Also, the application server 400 may be capable of performing the method 300 shown in FIG. 3. Referring to FIG. 4, the application server 400 includes a network interface 410, a processor 420, an extractor 430, and an application manager 440. The network interface 410 may transmit and receive data over a network such as the Internet and/or a private network. The processor 420 may control the overall operations of the application server 400 and may include hardware and software for performing the operations of the application server described herein. The application server 400 also includes the application manager 440 which controls the installation, registration process, and execution of mobile applications on user devices. For example, the application manager 440 may handle application operations between users and the mobile application backend and/or databases (not shown).

According to various example embodiments, the application server 400 may provide a mobile device with a customized URI. The network interface 410 may receive a request to render a resource from a mobile device, and the request may include item information associated with an item. For example, the request may include a text message and the item information may include characters included in a body of the text message. As another example, the request may include speech, and the item information may include spoken words or phrases included in the speech. The extractor 430 may extract an item identifier from the item information included in the request. For example, the request may include a text message including a body and a plurality of characters within the body, and the extractor 430 may extract at least one word from the plurality of characters included within the body of the text message. As another example, the request may include speech, and the extractor 430 may extract a word or a plurality of words from the speech.

The processor 420 may determine whether the mobile device corresponds to an existing user of the mobile application corresponding to the request. For example, the processor 420 may determine the mobile device corresponds to an existing user in response to detecting that the mobile application is currently installed on the mobile device using an executable code, a device ID, and the like. In response to determining the mobile device corresponds to an existing user of the mobile application, the processor 420 may determine a customized URI associated with the item and associated with the mobile application based on the extracted item identifier and control the network interface 410 to transmit the customized URI to the mobile device. For example, the customized URI may include a deep link within the mobile application to customized content associated with the item. In one example, the request may include a vocal command received from a user of the mobile device, and the customized URI may include a deep link within the mobile application to customized content associated with the item that is based on the vocal command. On the other hand, in response to determining the mobile device does not correspond to an existing user of the mobile application, the processor 420 may control the network interface 410 to transmit a URL of a web page associated with the mobile application to the mobile device.

Figure 5:
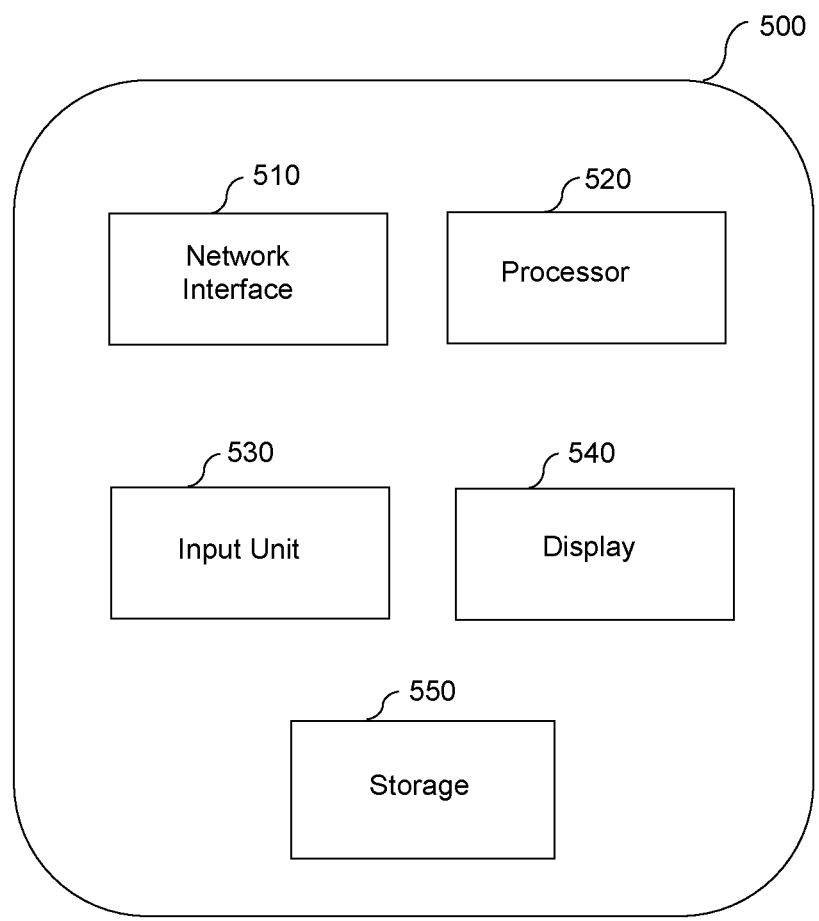
FIG. 5 is a diagram illustrating a user device in accordance with an example embodiment.

FIG. 5 illustrates a user device 500 in accordance with an example embodiment. The user device 500 may correspond to the user device 110 shown in FIG. 1, and may perform any of the actions or operations previously described therewith. For example, the user device 500 may be a mobile device, a tablet, a computer, a laptop computer, a notebook computer, a smart wearable device, a kiosk, a television, an appliance, and the like.

Referring to FIG. 5, the user device 500 includes a network interface 510, a processor 520, an input unit 530, a display 540, and a storage 550. The network interface 510 may transmit and receive data over a network such as the Internet and/or a private network. The processor 520 may include a single core processing device, a multicore processing device, or multiple processing devices. The processor 520 may control the overall operations of the user device 500. The input unit 530 may include one or more of a keyboard, a mouse, a touchpad, a voice recognition module, microphone, a motion recognition module, and the like. The display 540 may be an embedded display such as a touch screen on a mobile device or it may be an external display attached to the computing device through a connection such as a wired or wireless connection. The storage 550 may include any desired memory, for example, random access memory (RAM), one or more hard disks, cache, hybrid memory, an external memory, flash memory, and the like. Although not shown in FIG. 5, the user device 500 may include other features not shown, or one or more of the features may be omitted.

According to various aspects, the user device 500 may download and install mobile applications through an application store. For example, software for a mobile application may be received via the network interface 510 and may be installed by the processor 520 in response to commands input by a user through the input unit 530. The installation of the mobile application and registration with the mobile application may also be performed with an application server corresponding to the mobile application. While the mobile application is executing on the user device 500, the user may register a payment account with the application server through the mobile application.

According to various embodiments, a user of the user device 500 may input a request through the input unit 530 that is associated with a mobile application. For example, the request may be a text message entered using a keyboard or touchpad, and the request may be transmitted by the network interface 510 to an application server. As another example, the request may be speech that is input through a microphone. The input unit 530 may include the microphone as well as a speech recognition module for determining words included in the speech. Accordingly, the network interface 510 may transmit a request including the speech or text extracted from the speech to the application server. The request may include item information based on an item such as a product or a service. Furthermore, the network interface 510 may receive at least one of a customized URI or a URL based on the item information included in the request.

As will be appreciated based on the foregoing specification, the above-described examples of the disclosure may be implemented using computer programming or engineering techniques including computer software, firmware, hardware or any combination or subset thereof. Any such resulting program, having computer-readable code, may be embodied or provided within one or more non transitory computer-readable media, thereby making a computer program product, i.e., an article of manufacture, according to the discussed examples of the disclosure. For example, the non-transitory computer-readable media may be, but is not limited to, a fixed drive, diskette, optical disk, magnetic tape, flash memory, semiconductor memory such as read-only memory (ROM), and/or any transmitting/receiving medium such as the Internet, cloud storage, the internet of things, or other communication network or link. The article of manufacture containing the computer code may be made and/or used by executing the code directly from one medium, by copying the code from one medium to another medium, or by transmitting the code over a network.

The computer programs (also referred to as programs, software, software applications, "apps", or code) may include machine instructions for a programmable processor, and may be implemented in a high-level procedural and/or object-oriented programming language, and/or in assembly/machine language. As used herein, the terms "machine-readable medium" and "computer-readable medium" refer to any computer program product, apparatus, cloud storage, internet of things, and/or device (e.g., magnetic discs, optical disks, memory, programmable logic devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal that may be used to provide machine instructions and/or any other kind of data to a programmable processor.

The above descriptions and illustrations of processes herein should not be considered to imply a fixed order for performing the process steps. Rather, the process steps may be performed in any order that is practicable, including simultaneous performance of at least some steps. Although the disclosure has been described in connection with specific examples, it should be understood that various changes, substitutions, and alterations apparent to those skilled in the art can be made to the disclosed embodiments without departing from the spirit and scope of the invention as set forth in the appended claims.

What is claimed is:

1. A device for determining a customized resource, the device comprising:
   a network interface configured to receive a request to render a resource from a user device, the request comprising item information associated with an item;
   an extractor configured to extract an item identifier from the item information; and
   a processor configured to determine whether the user device corresponds to an existing user of a mobile application corresponding to the request,
   wherein in response to determining the user device corresponds to an existing user of the mobile application, the processor further determines a customized uniform resource indicator (URI) that directs the user device to a page within the mobile application that corresponds to the item based on a character comparison of the extracted item identifier to character strings of URIs of the mobile application, and controls the network interface to transmit the customized URI to the user device, and
   in response to determining the user device does not correspond to an existing user of the mobile application, the processor further controls the network interface to transmit a uniform resource locator (URL) of a web page of a website that enables a user to register for the mobile application to the user device.

2. The device of claim 1, wherein the processor is configured to determine the user device corresponds to an existing user in response to detecting that the mobile application is currently installed on the user device.

3. The device of claim 1, wherein the customized URI comprises a deep link within the mobile application to customized content associated with the item.

4. The device of claim 1, wherein the request comprises a vocal command received from a user of the user device, and the customized URI comprises a deep link within the mobile application to customized content associated with the item that is based on the vocal command.

5. The device of claim 1, wherein the request comprises a text message including a body and a plurality of characters within the body, and the extractor is configured to extract at least one word from the plurality of characters included within the body of the text message.

6. The device of claim 1, wherein the processor determines that the user device corresponds to an existing user of the mobile application, determines the customized URI associated with the item within the mobile application based on the extracted item identifier, and controls the network interface to transmit the customized URI to the user device.

7. The device of claim 1, wherein the processor is configured to determine the customized URI by comparing the item identifier extracted from the request with previously stored URIs.

8. A method for determining a customized resource, the method comprising:
   receiving, by an application server from a user device, a request to render a resource, the request comprising item information associated with an item;
   extracting, by the application server, an item identifier from the item information;
   determining, by the application server, whether the user device corresponds to an existing user of a mobile application corresponding to the request;
   in response to determining the user device corresponds to an existing user of the mobile application, determining, by the application server, a customized uniform resource indicator (URI) that directs the user device to a page within the mobile application that corresponds to the item based on a character comparison of the extracted item identifier to character strings of URIs of the mobile application, and transmitting, to the user device, the customized URI; and
   in response to determining the user device does not correspond to an existing user of the mobile application, transmitting, by the application server to the user device, a uniform resource locator (URL) of a web page of a website that enables a user to register for the mobile application.

9. The method of claim 8, wherein the user device is determined to correspond to an existing user in response to detecting that the mobile application is currently installed on the user device.

10. The method of claim 8, wherein the customized URI comprises a deep link within the mobile application to customized content associated with the item.

11. The method of claim 8, wherein the request comprises a vocal command received from a user of the user device, and the customized URI comprises a deep link within the mobile application to customized content associated with the item that is based on the vocal command.

12. The method of claim 8, wherein the request comprises a text message including a body and a plurality of characters within the body, and the item identifier comprises at least one word extracted from the plurality of characters included within the body of the text message.

13. The method of claim 8, wherein the determining comprises determining the user device corresponds to an existing user of the mobile application, and
   the method further comprises determining, by the web server, the customized URI associated with the item within the mobile application based on the extracted item identifier and transmitting the customized URI to the user device.

14. The method of claim 8, wherein the determining the customized URI comprises comparing the item identifier extracted from the request with previously stored URIs.

15. A non-transitory computer readable medium having stored therein instructions that when executed cause a computing device to perform a method for determining a customized resource, the method comprising:
   receiving, by a web server from a user device, a request to render a resource, the request comprising item information associated with an item;
   extracting, by the web server, an item identifier from the item information;
   determining, by the web server, whether the user device corresponds to an existing user of a mobile application corresponding to the request;
   in response to determining the user device corresponds to an existing user of the mobile application, determining, by the web server, a customized uniform resource indicator (URI) that directs the user device to a page within the mobile application that corresponds to the item based on a character comparison of the extracted item identifier to character strings of URIs of the mobile application, and transmitting, to the user device, the customized URI; and
   in response to determining the user device does not correspond to an existing user of the mobile application, transmitting, by the web server to the user device, a uniform resource locator (URL) of a web page of a website that enables a user to register for the mobile application.

16. The non-transitory computer readable medium of claim 15, wherein the user device is determined to correspond to an existing user in response to detecting that the mobile application is currently installed on the user device.

17. The non-transitory computer readable medium of claim 15, wherein the customized URI comprises a deep link within the mobile application to customized content associated with the item.

18. The non-transitory computer readable medium of claim 15, wherein the request comprises a vocal command received from a user of the user device, and the customized URI comprises a deep link within the mobile application to customized content associated with the item that is based on the vocal command.

19. The non-transitory computer readable medium of claim 15, wherein the request comprises a text message including a body and a plurality of characters within the body, and the item identifier comprises at least one word extracted from the plurality of characters included within the body of the text message.

20. The non-transitory computer readable medium of claim 15, wherein the determining comprises determining the user device corresponds to an existing user of the mobile application, and
   the method further comprises determining, by the web server, the customized URI associated with the item within the mobile application based on the extracted item identifier and transmitting the customized URI to the user device.

* * * * *